United States Patent Office 3,118,088
Patented Jan. 14, 1964

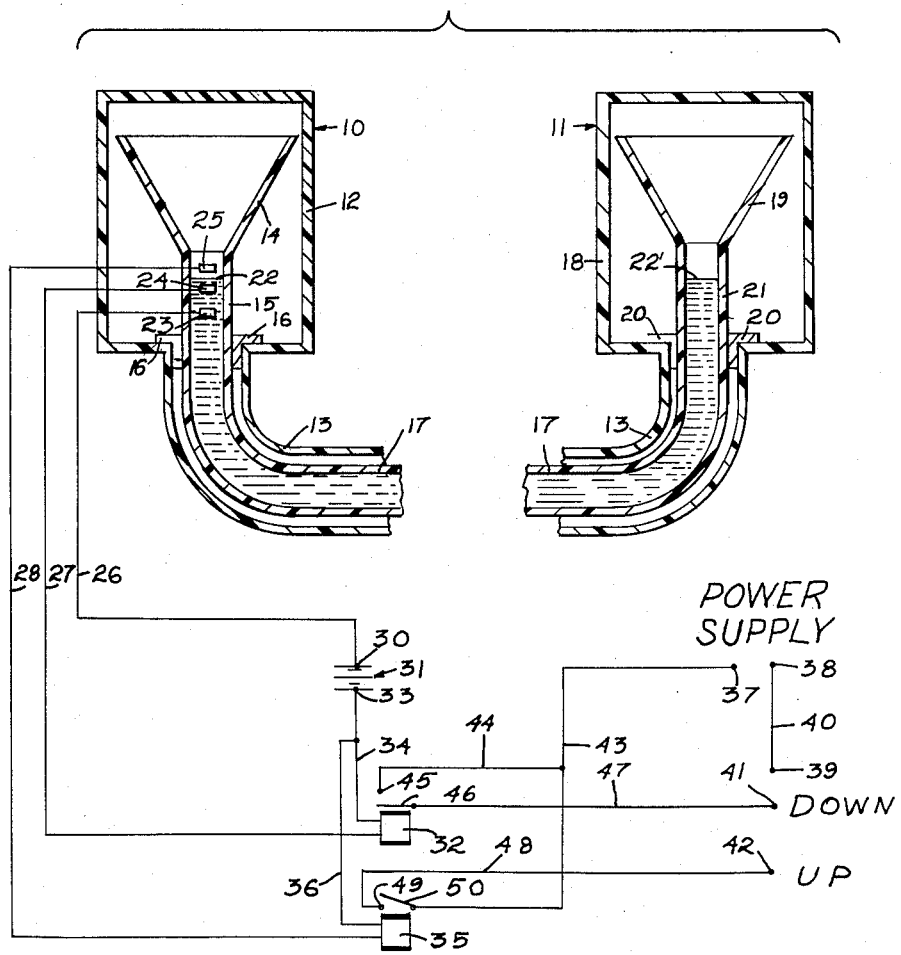

3,118,088
LEVEL SENSITIVE CONTROL CIRCUIT
Raymond A. Hanson, Palouse, Wash.
Filed Dec. 3, 1959, Ser. No. 857,173
2 Claims. (Cl. 317—137)

This invention relates to a novel level sensitive control to operate a device in response to changes in elevation of one point with respect to another. Prior level controls normally utilized one side of a liquid system to measure tilting in one direction and the remaining side to measure tilting in the opposite direction. This arrangement has a sensitivity which depends upon the amount of liquid in the system, since the operating angle of tilt required to contact electrodes lessens with an increase in the liquid volume.

Such controls are used in many applications where a level final product is desirable. An example is earth digging machines using controls such as disclosed in my co-pending application, Serial No. 642,310, filed on February 25, 1957.

It is an object of this invention to provide a level sensitive control which will respond to absolute variations in level, regardless of the amount of liquid in the level sensing arrangement.

It is another object of this invention to provide a level sensitive switch wherein all the controls are located at one end of the system and wherein the reference level tank contains no mechanical or electrical components.

These objects are obtained through the use of a reference tank and a control tank connected to form a sealed liquid system. Three electrodes are sealed into the control tank, the lowest being a common conductor, the second being connected to a reverse acting control unit, the third being connected to a normal control unit. These two control units then adjust the monitored system to compensate for level deviations.

These objects will be more easily seen in the following disclosure and the accompanying drawings, which illustrates one preferred form of my invention. It is to be emphasized that this form is exemplary, and is not intended to limit the scope of the invention beyond the limitations of the annexed claims.

The figure shown is a diagrammatic view of the level sensitive liquid system and the control circuit governed by it.

A diagrammatic illustration of the invention is shown, since specific structures are not controlling. The invention relates to the interrelation between three simple systems; the liquid level sensing system, the control system and the power leveling system. Since the last of these is old and is exemplified in my above-mentioned application, only the connections to the power leveling system will be discussed.

The liquid level sensing system consists of two tanks generally denoted as 10 and 11. Tank 10 is adapted to be mounted on the machine or device whose elevation is to be monitored and contains all the electrical connections for the control system. Tank 11 is a reference tank and is adapted to be placed at a location having a constant elevation against which the elevation of tank 10 is to be judged.

Tank 10 has an outer casing 12 which may be cylindrical in shape and may be formed of clear plastic or any desired material which will withstand its proposed use. Attached to the lower end of casing 12 is a flexible hose 13 which must be air tight, but which may be of any desired length and may be made of any suitable material.

A liquid system comprises a rigid cylindrical section of tubing 15 capped by a funel-shaped portion 14. The system is positioned vertically by braces 16 which contact tubing 15 at several points but do not seal line 13. The upper surface of enlarged portion 14 does not contact casing 12 and allows free passage of air between all points within the casing 12. Connected to tubing 15 is a flexible hose 17 which is concentric within hose 13 and which may be made of any suitable material.

The construction of tank 11 is identical to that described with reference to tank 10 and is made of identical dimensions It consists of an outer casing 18 connected to the remaining end of flexible hose 13, a piece of tubing 21 braced at 20, having an enlarged portion 19 and opening to the remaining end of the inner flexible hose 17. The hose 13 and the tanks 10 and 11 therefore constitute a completely sealed system. The hose 17 and tubing sections 15 and 21 are filled with a conductive liquid such as mercury to the level shown at 22 and 22', which is the normal level. The remainder of the system is filled with normal atmospheric air. The hoses 17 and 13 allow free passage of liquid and air between the two tanks 10 and 11.

Located within tubing 15 are three electrodes, which are labeled 23, 24 and 25 in an upward direction. These electrodes are sealed into the tubing 15 and can be mounted in any desired manner. They may also be adjustable, so long as their relative positions with respect to one another is maintained. The electrodes 23, 24, 25 are connected by means of wires 26, 27, 28, respectively, to the control system. Wires 26, 27, 28 are also sealed within casing 12 to maintain the sealed liquid and air systems intact.

The control system will now be described. Wire 26 which leads to the lowest electrode 23, is connected to one terminal 30 of a battery 31. Electrode 23 constitutes the common terminal of the control system. Wire 27, which is connected to electrode 24, leads to a first terminal of a relay 32, whose remaining terminal is connected by means of line 34 to the second terminal 33 of battery 31. Wire 28, which is connected to the top electrode 25, is also wired to a first terminal of a relay 35. The remaining terminal of relay 35 is connected by means of wire 36 to line 34 and thereby to terminal 33 of battery 31.

The power leveling system illustrated is electrical. However, it might well be hydraulic, mechanical or a combination of the three types, without deviating from the scope of the basic interrelation of systems which is the core of this invention. The leveling system is shown only in its connections. A power supply has two terminals 37, 38. One of these terminals 38, is connected to the common terminal 39 of the leveling system by means of line 40. The leveling system has two remaining teminals 42, 41 which respectively control its upward or downward correction movement.

The "down" terminal 41 is connected by wire 47 to the movable contact 46 of relay 32. Relay 32 is of the reverse acting type, having a contact 46 which is normally biased to the "closed" position. When activated, relay 32 maintains contact 46 "open." The stationary contact 45 in relay 32 is connected by means of lines 44 and 43 to the remaining terminal 37 of the power supply.

The "up" terminal 42 is connected by wire 48 to the stationary contact 49 of relay 35. Relay 35 is of the normal type, having a movable contact 50 which is normally biased to an "open" position. When relay 35 is activated, the contact 50 is "closed" against contact 49. Movable contact 50 is connected by means of line 43 to terminal 37 of the power supply.

The operation of these systems is as follows. Tank 10 is located on the device whose level is to be monitored. Tank 11 is fixed to a stationary or moving reference structure having a constant elevation. The liquid level 22, 22' is normally held as shown in the figure, so as to be between electrodes 24, 25. This results in a closed circuit to relay 32 and an open circuit to relay 35. The contacts 45, 46 and 49, 50 are therefore open in this normal condition.

If the elevation of tank 10 is lowered, the liquid level 22 will rise, establishing contact with electrode 25. This will complete the circuit to relay 35 which will close contacts 49, 50 and thereby activate the leveling power system to raise the structure on which tank 12 is mounted.

If the elevation of tank 10 is raised, level 22 will fall below electrode 24, which will open the circuit of relay 32 and will allow contacts 45, 46 to be closed. This will activate the power system to lower the structure. In this manner any changes in elevation of the monitored structure will be corrected. The sensitivity of the device may be increased by spacing electrodes 25, 24 closer to one another.

The final power connections may be of any desired type. They may be merely connections to light bulbs which would flash to allow manual correction of the level surface. Relays 32, 35 may be replaced by solenoids which may activate hydraulic valves or mechanical linkages to control a leveling system. The level sensitive arrangement is capable of use in many various installations without great modification, all of which are intended to fall under the scope of this disclosure. Therefore, the specific arrangement disclosed is not intended to limit the extent of this invention except as it is defined in the following claims.

Having thus described my invention, I claim:

1. A level sensitive control circuit comprising a first tank fixed at a reference elevation, an independently mounted second tank fixed upon a monitored structure, flexible hose means connecting said tanks to thereby complete a hydraulic system joining said first and second tanks, a conductive liquid within said system having a normal level within each of said tanks, said second tank including lower, intermediate and upper electrode means vertically positioned within said tank so as to allow electrical contact to be established between said conductive liquid and said electrodes, the lower means being wired to a first terminal of an electrical power source, the intermediate electrode means being wired to a first terminal of first level control means having a normally operative controlled portion, the remaining terminal of the first level control means being wired to the second terminal of the electrical power source, the upper electrode means being wired to a first terminal of second level control means having a normally inoperative controlled portion, the remaining terminal of the second level control means being wired to the second terminal of the electrical power source, the upper electrode being located within said second tank above the normal level of the conductive liquid therein and the intermediate and lower electrodes being located within said second tank below the normal level of the conductive liquid therein.

2. A level sensitive control circuit comprising a first tank fixed at a reference elevation, an independently mounted second tank fixed upon a monitored structure, flexible hose means connecting said tanks to thereby complete a hydraulic system joining said first and second tanks, a conductive liquid within said system having a normal level within each of said tanks, said second tank being provided with first and second electrode means located so as to allow electrical contact to be established between said conductive liquid and said electrode means, said first electrode means being located within said second tank at an elevation below the normal level of the conductive liquid, said second electrode means being located within said second tank at an elevation above the normal level of the conductive liquid, means establishing electrical contact between said conductive liquid and a first terminal of an electrical power supply, first relay means having contacts biased to a closed position, said first relay means being wired to said first electrode means and to the remaining terminal of said electrical power supply, and second relay means having contacts biased to an open position, said second relay means being wired to said second electrode means and to the remaining terminal of said electrical power supply.

References Cited in the file of this patent
UNITED STATES PATENTS

| | | |
|---|---|---|
| 2,608,609 | Fitch | Aug. 26, 1952 |
| 2,716,169 | Hanson | Aug. 23, 1955 |
| 2,801,511 | Vogelaar | Aug. 6, 1957 |